(12) United States Patent
Kim et al.

(10) Patent No.: US 9,366,294 B2
(45) Date of Patent: Jun. 14, 2016

(54) STRUCTURE OF BRACKET OF INNER-SHAFT BEARING

(71) Applicant: Hyundai Motor Company, Seoul (KR)

(72) Inventors: Jang-Ho Kim, Whasung-Si (KR); Sung-Su Yoo, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/495,503

(22) Filed: Sep. 24, 2014

(65) Prior Publication Data

US 2015/0093062 A1 Apr. 2, 2015

(30) Foreign Application Priority Data

Sep. 27, 2013 (KR) .......................... 10-2013-115464

(51) Int. Cl.
*F16C 35/04* (2006.01)
*F16C 19/06* (2006.01)
*F16C 3/02* (2006.01)

(52) U.S. Cl.
CPC ............... *F16C 35/045* (2013.01); *F16C 19/06* (2013.01); *F16C 3/02* (2013.01)

(58) Field of Classification Search
CPC ........ F16C 35/06; F16C 35/063; F16C 35/07; F16C 35/077
USPC ............ 384/428, 441, 537, 542, 584; 248/73, 248/224.8
See application file for complete search history.

(56) References Cited

U.S. PATENT DOCUMENTS

| | | | | |
|---|---|---|---|---|
| 4,648,475 A | * | 3/1987 | Veglia | B60K 17/04 180/297 |
| 5,417,501 A | * | 5/1995 | Hyde | F01D 21/045 384/542 |
| 8,439,150 B1 | * | 5/2013 | Mesa | B60K 17/24 180/359 |
| 2003/0230683 A1 | * | 12/2003 | Hahn | F16C 35/04 248/200 |
| 2010/0065364 A1 | | 3/2010 | Felchner et al. | |

FOREIGN PATENT DOCUMENTS

CN 203157599 U * 8/2013

* cited by examiner

*Primary Examiner* — Phillip A Johnson
(74) *Attorney, Agent, or Firm* — Morgan, Lewis & Bockius LLP

(57) ABSTRACT

An inner-shaft bearing bracket structure may include an inner-shaft that may be installed between a differential gear or a reduction gear connected to a motor or a engine for generating rotational power of a vehicle and a drive shaft for transmitting the rotational power to wheels of the vehicle in a vehicle width direction, bearings which wrap an outer peripheral surface of the inner-shaft and to which the inner-shaft may be rotatably coupled, and a bearing bracket which connects a pipe that houses and supports the bearings therein and a boss formed in the motor to project forward, wherein the bearing bracket may be disposed on a side surface of the boss and may be coupled by bolts in the vehicle width direction of the vehicle body.

6 Claims, 4 Drawing Sheets

STRUCTURE OF BRACKET OF INNER-SHAFT BEARING

CROSS-REFERENCE TO RELATED APPLICATION

The present application claims priority to Korean Patent Application No. 10-2013-115464 filed on Sep. 27, 2013, the entire contents of which is incorporated herein for all purposes by this reference.

BACKGROUND

1. Field of the Invention

The present invention relates to an inner-shaft bearing bracket structure, and more particularly, to an inner-shaft bearing bracket structure in which a bearing bracket is disposed on a side surface of a boss and coupled to the bearing bracket by bolts in the vehicle width direction of a vehicle body, thereby improving dynamic stiffness and natural frequency of the bearing bracket to solve problems of noise vibration and harshness (NVH) of the vehicle.

2. Description of Related Art

In general, a vehicle has a drive shaft installed between a transmission and wheels, and driving force of an engine is increased or decreased through the transmission and then is transmitted to the wheels through the drive shaft to propel the vehicle.

However, when the driving force of the engine increased or decreased simply through the transmission is transmitted to the wheels of the vehicle via the drive shaft, steering stability of the vehicle is lowered due to a difference in frictional force between the left and right wheels depending on ground states and a difference in rotational speed between left and right wheels generated during rotation of the vehicle.

In order to correct these problems, a differential gear adapted to adjust the rotational speed of the left and right wheels is installed between the drive shaft and the transmission to improve steering performance and allows a safe driving when driving on an uneven road or when turning.

Further, in the case of an electric vehicle, a power source of a battery is converted into rotational mechanical force in the motor and is transmitted to the reduction gear, and finally drives the wheels via the drive shaft, thereby propelling the vehicle.

The differential gear of the general vehicle or the reduction gear of the electric vehicle cannot be installed in an intermediate portion of the vehicle due to space constraints of the engine or the motor and is biasedly installed on one side, thereby lengths of the drive shafts of the left and right wheels are applied in a different manner, and a difference in balance occurs between the left and right wheels, which becomes a factor of degradation of riding comfort and drivability.

In recent years, in order to be able to apply the same length of left and right drive shafts in view of riding comfort and drivability of the vehicle, an inner-shaft is installed between the drive shafts and a power train to form a balance between the left and right wheels.

As shown in FIGS. 1 and 2, the inner-shaft 1 is coupled to bearings 2, a pipe 3, and a bearing bracket 4, and the bearing bracket 4 is fastened to a projecting boss 5 by an upper front bolting structure.

However, since the upper front bolting fastening structure applied to the conventional inner-shaft bearing bracket structure is in a form of a cantilever, there is a problem of an occurrence of noise and vibration NVH of a vehicle due to insufficient rigidity, low natural frequency, and weak dynamic stiffness, and specifically, there are problems in that an idling sound of a D stage is rough according to a specific vehicle model, vibration of the vehicle body excessively occurs, and vibration during acceleration occurs due to resonance of the bearing bracket.

As shown in FIGS. 2a and 2b, although it is possible to improve such problems by applying a front upper and lower fastening structure having the bearing brackets 4 formed on both sides of the pipe 3, the conventional integrated inner-shaft bearing bracket structure requires a process of rotating the bearing bracket 4 for adjusting the engagement position between the bearing brackets 4 and the boss 5, and at this time, there is a problem of assembling properties in that the bearing bracket 4 is caught by interference of the boss 5 at the time of application to the front upper and lower front fastening structure.

In addition, when fastening the bearing bracket and the boss while omitting the process of rotating the bearing bracket due to the problem of assembling properties of the bearing bracket, there is a problem of an occurrence of interference between the parts for arranging the inner-shaft and the bearing bracket.

In addition, conventionally, the inner-shaft bearing bracket structure has been constituted in a separation type in which the fastening points of the bearing bracket are added to a lower part as well as an upper part, and that the bearing bracket is separated or the bearing bracket and the bearings are separated from each other, thereby improving the dynamic stiffness of the vehicle, and improving the problem of assembling properties of the bearing bracket.

However, there have been problems in that the production costs of the vehicle increase due to increases in the number of components and the working steps, a vehicle weight increases, and assembling characteristics are disadvantageous compared to a case where the bearing bracket is integrally formed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an inner-shaft bearing bracket structure in which a bearing bracket is disposed on a side surface of a boss and is coupled by bolts in the vehicle width direction of a vehicle body to improve a problem of assembling properties of the bearing bracket, and which includes a knock bush press-fitted to the side surface of the boss to partially protrude to improve the problem of misalignment of the inner-shaft.

In an aspect of the present invention, an inner-shaft bearing bracket structure may include an inner-shaft that is installed between a differential gear or a reduction gear connected to a motor or a engine for generating rotational power of a vehicle and a drive shaft for transmitting the rotational power to wheels of the vehicle in a vehicle width direction, bearings which wrap an outer peripheral surface of the inner-shaft and to which the inner-shaft is rotatably coupled, and a bearing bracket which connects a pipe that houses and supports the bearings therein and a boss formed in the motor to project forward, wherein the bearing bracket is disposed on a side surface of the boss and is coupled by bolts in the vehicle width direction of the vehicle body.

The bearing bracket may include a first bearing bracket that connects an upper boss disposed adjacent to an upper part of the pipe and the pipe, and a second bearing bracket that connects a lower boss disposed adjacent to the lower part of the pipe and the pipe.

The boss may further include a boss hole formed through the boss in the vehicle width direction, and a knock bush that may have an inner periphery of the same size as that of an inner periphery of the boss hole, and is press-fitted to the side surface of the boss to partially protrude, wherein the knock bush is fitted to the bearing bracket.

The inner-shaft bearing bracket structure may further include a boss hole formed through the boss in the vehicle width direction, and a knock bush that may have an inner periphery of the same size as that of the inner periphery of the boss hole, and is press-fitted to the side surface of the bearing bracket to partially protrude, wherein the knock bush is fitted to the boss hole.

The bearings, the pipe, and the bearing bracket are integrally formed.

The pipe and the bearing bracket are made of an aluminum material.

Effects of the present invention having the structure as described above are to allow assembling having no problem of interference between the parts for arranging the inner-shaft and the bracket without rotation of the bearing bracket, by disposing the bearing bracket on the side surface of the boss and coupling the bearing bracket by bolts in the vehicle width direction of the vehicle body.

Furthermore, there is an effect of increasing natural frequency of the bearing bracket, enhancing the dynamic stiffness, and improving the problem of noise vibration (NVH) of the vehicle, by constituting the bearing bracket to may include the first bearing bracket and the second bearing bracket and applying the upper and lower side surface fastening structure rather than the conventional upper front fastening structure.

Furthermore, there is an effect of completely removing the possibility of an occurrence of unbalance vibration of the bearing bracket, by applying an inner-shaft misalignment preventing structure that may include a knock bushing press-fitted into the side surface of the boss to partially protrude and allows the bearing bracket to be coupled to the knock bush.

Additionally, there is an effect of reducing the number of the fastening parts, reducing the weight of a vehicle, and reducing the number of working steps, by forming the pipe and the bearing bracket integrally rather than in a separation type.

Furthermore, there is an effect of being able to reduce the weight of a vehicle body, by forming the pipe and the bearing bracket to be applicable by a lightweight material, i.e., an aluminum material without deterioration of dynamic stiffness and natural frequency.

Consequently, the inner-shaft bearing bracket structure according to an exemplary embodiment of the present invention has an effect of increasing natural frequency and dynamic stiffness of the bearing bracket to improve the problem of noise and vibration of a vehicle, removing the possibility of the occurrence of unbalanced vibration of the bearing bracket by applying the inner-shaft misalignment preventing structure, and reducing the weight of the vehicle and the number of working steps.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
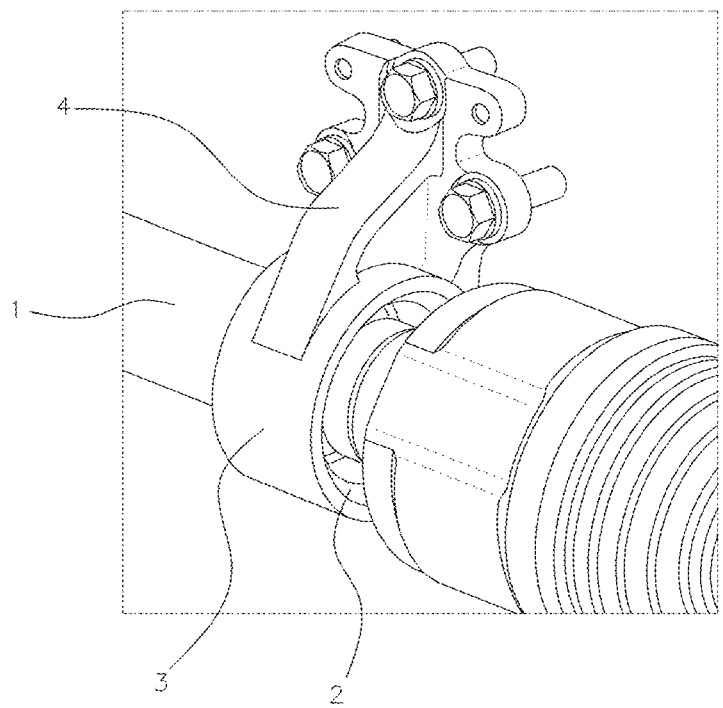
FIG. 1 is a perspective view showing an aspect in which an upper front fastening structure is applied to the conventional inner-shaft bearing bracket structure.
Figure 2A:
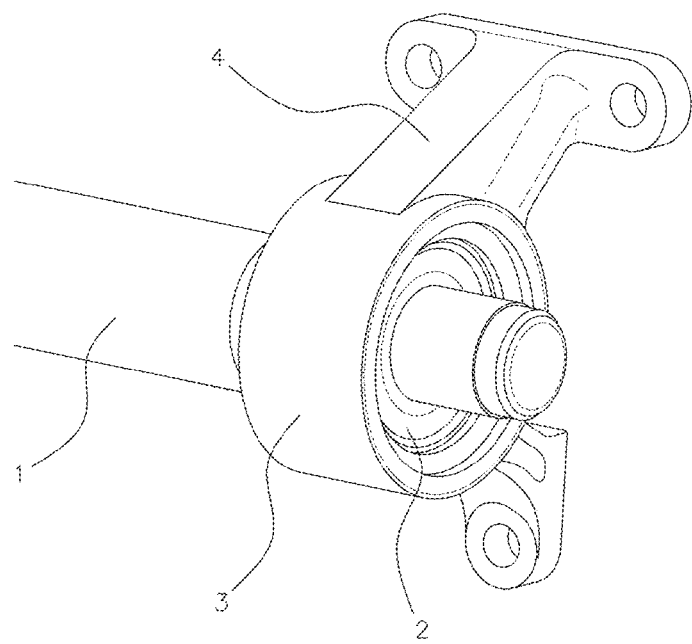
FIG. 2a is a perspective view showing an aspect in which an upper and lower front fastening structure is applied to the conventional inner-shaft bearing bracket structure.
Figure 2B:
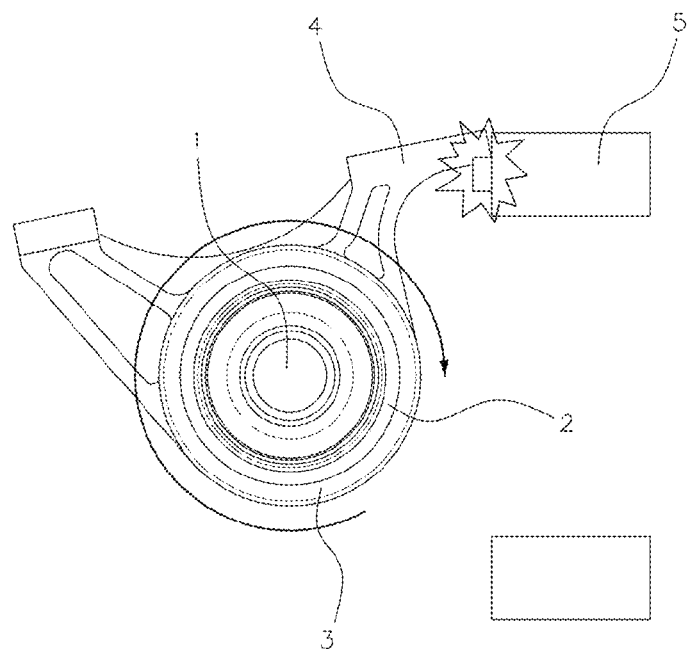
FIG. 2b is a side view showing an aspect in which an interference with the boss occurs in the fastening structure of FIG. 2a during rotation of the bearing bracket.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in detail on the basis of the accompanying drawings. The differential gear of the general vehicle or the reduction gear The inner-shaft bearing bracket structure according to an exemplary embodiment of the present invention includes an inner-shaft 40 installed between a differential gear or a reduction gear 20 connected to a engine or a motor 10 for generating rotational power of a vehicle and a drive shaft 30 for transmitting the rotational power to wheels of the vehicle in a vehicle width direction; bearings 50 which wrap the outer peripheral surface of the inner-shaft 40 and to which the inner-shaft 40 is rotatably coupled; and. a bearing bracket 80 which connects a pipe 60 that houses and supports the bearings 50 inside and a boss 70 formed in the engine or the motor 10 to project forward, wherein the bearing bracket 80 is disposed on the side surface of the boss 70, and is coupled by bolts in the vehicle width direction of the vehicle body.

Figure 3:
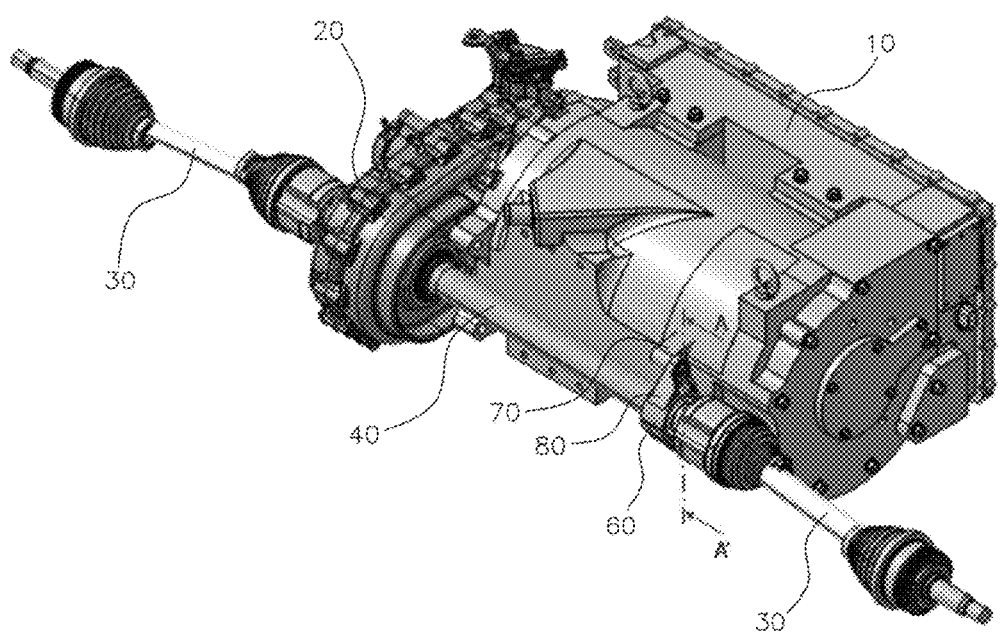
FIG. 3 is a perspective view showing an overall aspect of the inner-shaft bearing bracket structure according to an exemplary embodiment of the present invention.

As shown in FIG. 3, in the shown embodiment, the differential gear or the reduction gear 20 is biasedly coupled to the left front of the engine or the motor 10, the drive shaft 30 configured to transmit rotational power to the wheels of the vehicle is coupled to a left side based on the differential gear or the reduction gear 20 in the vehicle width direction, and the inner-shaft 40 is coupled to a right side in the vehicle width direction.

Another drive shaft 30 is coupled to the right side of the inner-shaft 40 in the vehicle width direction to transmit rotational power to the wheels of the vehicle.

That is, in view of riding comfort and the drivability of a vehicle, by applying the drive shafts 30 of the same length and disposing the inner-shaft 40 between the drive shafts 30, a balance is formed between the left and right wheels.

Figure 4:
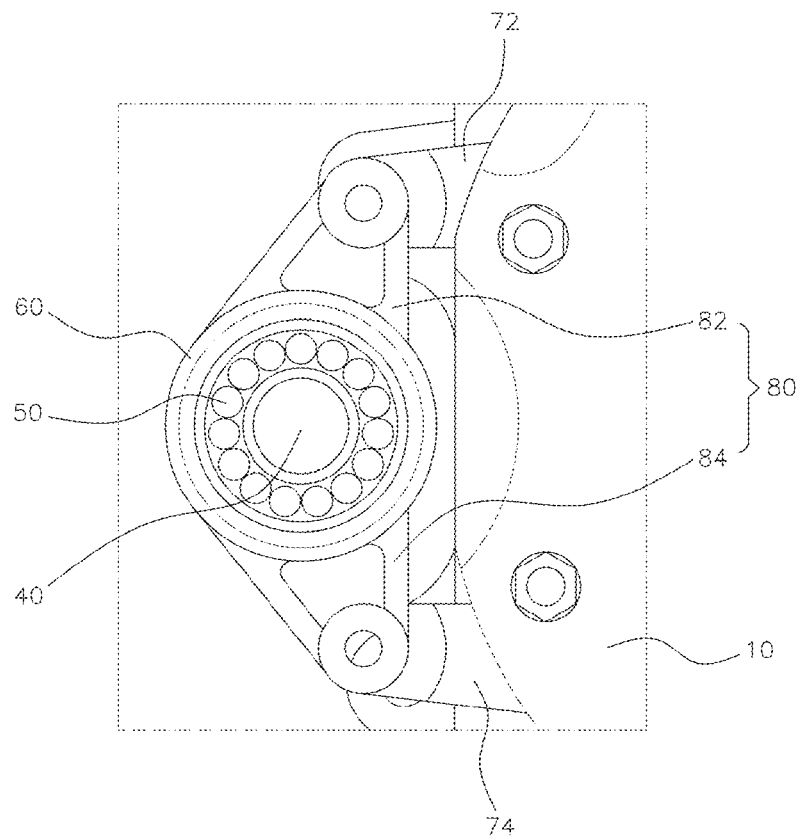
FIG. 4 is a cross-sectional view taken along a line A-A' in FIG. 3.

As shown in FIG. 4, the bearings 50 having the inner periphery of the same size as that of the outer periphery of the inner-shaft 40 are coupled to the inner-shaft 40 such that the inner-shaft 40 can rotate without friction, and the pipe 60 having the inner periphery of the same size as that of the outer periphery of the bearings 50 is coupled to the bearings.

Furthermore, as shown in FIGS. 3 and 4, in the shown embodiment, a boss including a boss hole 76 formed to be able to be coupled to the bearing bracket 80 by bolts protrudes on the right front of the engine or the motor 10, and the bearing bracket 80 is connected between the boss 70 and pipe 60.

The bearing bracket 80 is disposed adjacent to the right side surface of the boss 70 and is coupled to the boss 70 by bolts through the boss hole 76 in the vehicle width direction. Specifically, in the shown embodiment, the bolts sequentially pass through the bearing bracket 80 and the boss 70, and are coupled in a right-to-left direction.

Of course, the bolts can also be coupled in the left-to-right direction of the boss 70, but in the shown embodiment, in view of assembling characteristics of the bearing bracket, man-hours or the like, the bolts are preferably coupled in the right-to-left direction, and on the contrary to the shown embodiment, in the structure in which the differential gear or the reduction gear 20 is disposed on the front right of the motor 10 and the boss 70 is disposed on the left front of the engine or the motor 10, the bolts are preferably coupled in the left-to-right direction.

By coupling the bearing bracket 80 to the side surface of the boss 70 by bolts as described above, it is possible to improve the problem of assembling properties of the bearing bracket 80, and it is possible to implement a structure in which the upward and downward fastening of the bearing bracket 80 is performed as will be described later.

As shown in FIG. 4, it is preferred that the bearing bracket 80 includes a first bearing bracket 82 that connects an upper boss 72 disposed adjacent to the upper part of the pipe 60 and the pipe 60, and a second bearing bracket 84 that connects a lower boss 74 disposed adjacent to the lower part of the pipe 60 and the pipe 60.

The first bearing bracket 82 and the second bearing bracket 84 are preferably formed in a symmetrical shape facing each other based on the inner-shaft 40 to be configured to be coupled to the upper boss 72 and the lower boss 74, respectively, and are formed in a triangular form that abuts against the pipe 60 in the shown embodiment.

A person of ordinary skill will be appreciated that the bearing bracket 80 can be formed in a form of a boss, a form of an inner-shaft, and various forms in consideration of the interference element around the bearing bracket or the like.

By forming the bearing brackets 80 to include the first bearing bracket 82 and the second bearing bracket 84 as described above, the upper and lower fastening structure can be applied, and thus, it is possible to improve natural frequency and dynamic stiffness, thereby improving the problems of noise and vibration (NVH) of a vehicle.

Figure 5:
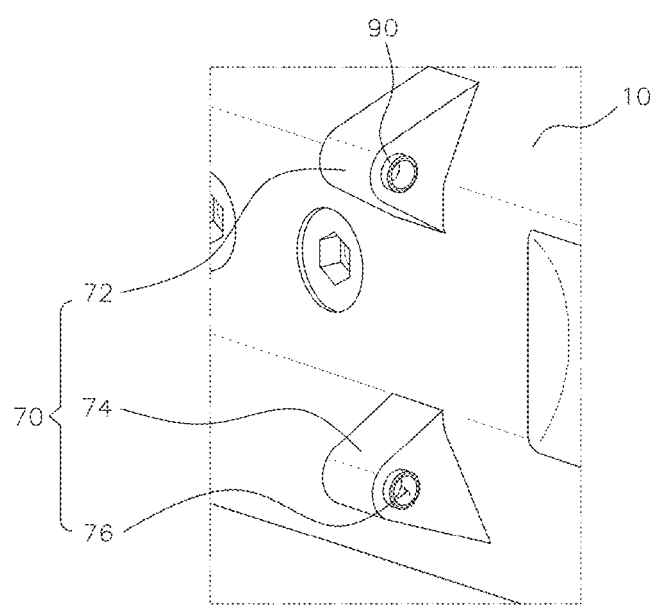
FIG. 5 is an enlarged view showing an aspect in which a knock bush is coupled to the boss in the inner-shaft bearing bracket structure according to another embodiment of the present invention.
Figure 6:
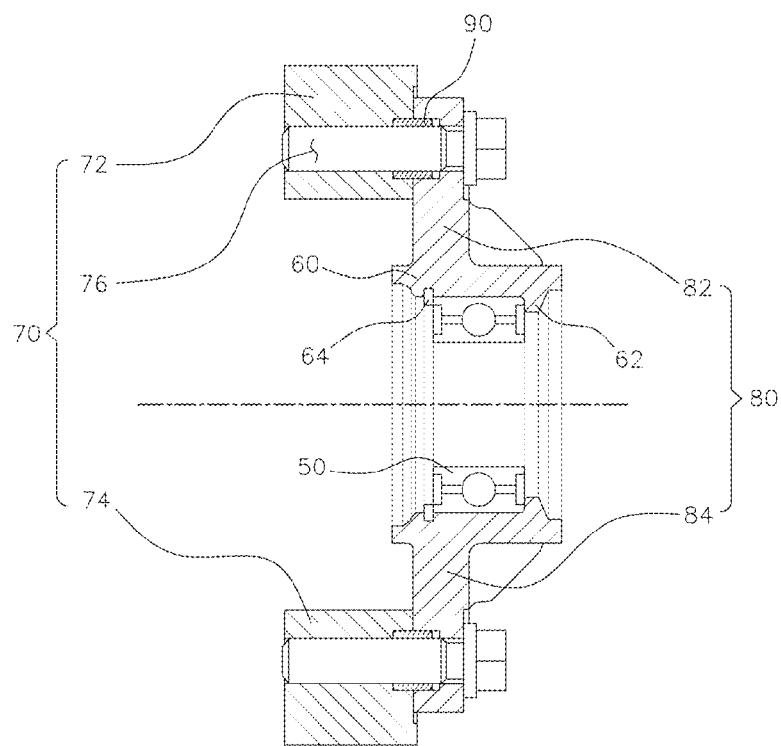
FIG. 6 is a cross-sectional view showing an aspect in which the bearing bracket is coupled to the knock bush in the inner-shaft bearing bracket structure according to another embodiment of the present invention.

As shown in FIGS. 5 and 6, it is preferred that the boss 70 further includes a knock bush 90 that has the same inner peripheral surface as the outer peripheral surface of the boss hole 76, and is press-fitted to the side surface of the boss 70 to partially protrude.

As shown in FIG. 6, the knock bush 90 is formed in a ring shape having an inner periphery of the same size as that of the outer periphery of the boss hole 76, a part thereof is press-fitted into the boss 70, and the remaining part thereof projects to the side surface of the boss 70.

Furthermore, as shown in FIG. 6, the bearing bracket 80 is formed with grooves having an inner periphery of the same size as that of the outer periphery of the knock bush 90 in response to the shape of the knock bush 90 to be configured to be fitted to the knock bush 90.

Furthermore, although not shown, the knock bush 90 can be press-fitted into the side surface of the bearing bracket 80 to partially protrude, and in this case, the boss 70 is preferably formed with grooves having the inner periphery of the same size as that of the outer periphery of the knock bush 90 in response to the shape of the knock bush 90 to be configured to be fitted to the knock bush 90.

Since the bearing bracket 80 and the boss 70 are coupled via the knock bush 90 as described above, it is possible to minimize the positional tolerance of the seating surface of the bearing bracket 80, it is possible to minimize the perpendicularity tolerance of the side surface of the boss 70 and the upper end of the bearing bracket 80, and it is possible to minimize the distance tolerance between the center of the boss hole 76 and the center of the pipe 60.

That is, by providing the knock bush 90, it is possible to apply misalignment preventing structure of the inner-shaft 40 to eliminate the possibility of the unbalanced vibration.

Furthermore, it is preferred that the bearing 50, the pipe 60, and the bearing bracket 80 be integrally formed.

That is, instead of separately forming the pipe 60 and the bearing bracket 60 by the individual components, it is preferred to form the pipe 60 and the bearing bracket 80 in a continuous form formed with one material, and to insert the bearings 50 into the inner side of the pipe 60, thereby generally integrally forming the pipe 60, the bearing bracket 80, and the bearings 50.

Figure 7:
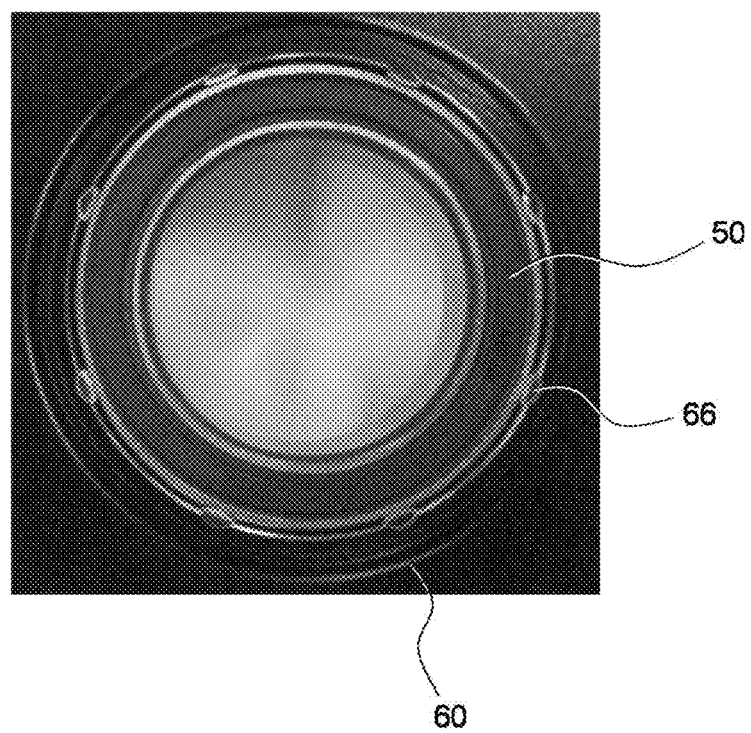
FIG. 7 is a plan view showing an aspect in which the bearings is fixed to the pipe through a pipe caulking in the inner-shaft bearing bracket structure according to another embodiment of the present invention.

Furthermore, as shown in FIGS. 6 and 7, it is preferred that the bearings 50 be press-fitted into the inside of the pipe 60 by interference fit in terms of improvement of the bearing durability, and in order to prevent the bearings 50 from being disengaged from the pipe 60 after assembly, it is preferred to place a catching jaw structure 62 for fixing the bearings 50 on one side of the pipe 60 and to mount a stopper ring 64 or a snap ring or fix the bearings via a pipe caulking 66 or the like on the other side.

As described above, by integrally forming the bearings 50, the pipe 60, and the bearing bracket 80, it is possible to reduce the number of parts, the manufacturing costs of a vehicle and the vehicle weight as compared to a configuration in which the bearing bracket 80 and the bearings 50 are separated from each other.

Further, it is preferred that the pipe 60 and the bearing bracket 80 be made of an aluminum material.

When conventionally applying aluminum rather than the cast iron as the materials of the pipe and the bearing bracket, it is possible to reduce the weight of a vehicle, but there is a problem in that dynamic stiffness and natural frequency are degraded.

However, since it is possible to apply to the upper and lower side surface fastening structure in the inner-shaft bearing bracket structure according to an exemplary embodiment of the present invention, it is possible to apply the lightweight material, i.e., aluminum without degradation of dynamic stiffness and natural frequency, and thus it is possible to maintain the dynamic stiffness and natural frequency while also reducing the weight of a vehicle.

It will be apparent to those skilled in the art that the present invention described above is not intended to be limited by the above-described examples and the accompanying drawings, and various substitutions, variations, and modifications can be made without departing from the technical spirit of the present invention.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An inner-shaft bearing bracket structure comprising:
    an inner-shaft that is installed between a differential gear or a reduction gear connected to a motor or an engine for generating rotational power of a vehicle and a drive shaft for transmitting the rotational power to wheels of the vehicle in a vehicle width direction;
    bearings which wrap an outer peripheral surface of the inner-shaft and to which the inner-shaft is rotatably coupled; and
    a bearing bracket which connects a pipe that houses and supports the bearings therein and a boss formed on the motor to project,
    wherein the bearing bracket is disposed on a side surface of the boss and is coupled by bolts in the vehicle width direction of the vehicle body.

2. The inner-shaft bearing bracket structure according to claim 1, wherein the boss comprises:
    an upper boss disposed adjacent to an upper part of the pipe; and
    a lower boss disposed adjacent to a lower part of the pipe, and
    wherein the bearing bracket includes:
        a first bearing bracket that connects the upper boss and the pipe; and
        a second bearing bracket that connects the lower boss and the pipe.

3. The inner-shaft bearing bracket structure according to claim 1, wherein the boss further includes:
    a boss hole formed through the boss in the vehicle width direction; and
    a knock bush that has an inner periphery of the same size as that of an inner periphery of the boss hole, and is press-fitted to the side surface of the boss to partially protrude,
    wherein the knock bush is fitted to the bearing bracket.

4. The inner-shaft bearing bracket structure according to claim 1, further comprising:
    a boss hole formed through the boss in the vehicle width direction; and
    a knock bush that has an inner periphery of the same size as that of the inner periphery of the boss hole, and is press-fitted to the side surface of the bearing bracket to partially protrude,
    wherein the knock bush is fitted to the boss hole.

5. The inner-shaft bearing bracket structure according to claim 1, wherein the bearings, the pipe, and the bearing bracket are integrally formed.

6. The inner-shaft bearing bracket structure according to claim 1, wherein the pipe and the bearing bracket are made of an aluminum material.

* * * * *